United States Patent
Zoulias et al.

(10) Patent No.: US 11,005,813 B2
(45) Date of Patent: *May 11, 2021

(54) SYSTEMS AND METHODS FOR MODIFICATION OF P0F SIGNATURES IN NETWORK PACKETS

(71) Applicant: PERFECTA FEDERAL, LLC, Springfield, VA (US)

(72) Inventors: George Zoulias, Lorton, VA (US); Joshua Madden, Lorton, VA (US)

(73) Assignee: Perfecta Federal LLC, Springfield, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/460,355

(22) Filed: Jul. 2, 2019

(65) Prior Publication Data
US 2019/0327208 A1    Oct. 24, 2019

Related U.S. Application Data

(63) Continuation of application No. 14/503,783, filed on Oct. 1, 2014, now Pat. No. 10,367,785.

(60) Provisional application No. 61/885,346, filed on Oct. 1, 2013.

(51) Int. Cl.
| *H04L 29/06* | (2006.01) |
| *H04L 29/12* | (2006.01) |
| *G06F 21/55* | (2013.01) |

(52) U.S. Cl.
CPC ...... *H04L 63/0245* (2013.01); *H04L 63/0281* (2013.01); *G06F 21/552* (2013.01); *H04L 29/12367* (2013.01)

(58) Field of Classification Search
CPC . G06F 9/4408; G06F 21/552; H04L 63/0442; H04L 63/0281; H04L 63/0245
USPC .......................................................... 726/19
See application file for complete search history.

(56) References Cited

U.S. PATENT DOCUMENTS

| 5,481,735 | A | | 1/1996 | Mortensen et al. |
| 5,835,726 | A | * | 11/1998 | Shwed ............... H04L 9/3247 709/229 |
| 6,460,088 | B1 | * | 10/2002 | Merchant ........... H04L 12/4645 370/356 |
| 6,675,218 | B1 | | 1/2004 | Mahler et al. |
| 7,509,673 | B2 | | 3/2009 | Swander et al. |
| 7,747,849 | B2 | | 6/2010 | Clevy et al. |
| 7,904,960 | B2 | | 3/2011 | Ithal |
| 8,180,892 | B2 | | 5/2012 | Deridder et al. |
| 8,352,393 | B2 | | 1/2013 | Greenwald et al. |
| 8,413,248 | B2 | | 4/2013 | Rash |
| 8,473,565 | B2 | | 6/2013 | Browning et al. |
| 8,707,440 | B2 | | 4/2014 | Gula et al. |
| 8,839,417 | B1 | | 9/2014 | Jordan |
| 8,861,369 | B2 | | 10/2014 | Reed |
| 8,893,133 | B2 | | 11/2014 | Nguyen |

(Continued)

*Primary Examiner* — Bryan F Wright
(74) *Attorney, Agent, or Firm* — Finnegan, Henderson, Farabow, Garrett & Dunner LLP

(57) ABSTRACT

A network traffic system includes a network traffic mangling application for modifying a signature of packets that are transmitted in the network traffic system. The network traffic mangling application includes a user module control agent and a kernel module for executing the network traffic mangling application. The user control module agent modifies and mangles the behavior of the kernel module and communicates with the kernel module.

20 Claims, 3 Drawing Sheets

(56) References Cited

U.S. PATENT DOCUMENTS

| | | | |
|---|---|---|---|
| 8,917,616 B2 | 12/2014 | Todd et al. | |
| 9,444,701 B2 | 9/2016 | Ioffe et al. | |
| 9,451,036 B2 | 9/2016 | Khan et al. | |
| 2003/0063599 A1* | 4/2003 | Aggarwal | H04L 12/6418 370/352 |
| 2004/0117478 A1 | 6/2004 | Triulzi et al. | |
| 2005/0022010 A1 | 1/2005 | Swander et al. | |
| 2005/0125195 A1* | 6/2005 | Brendel | H04L 63/1408 702/182 |
| 2006/0112272 A1* | 5/2006 | Morioka | H04L 63/0442 713/171 |
| 2006/0126504 A1 | 6/2006 | Meier et al. | |
| 2006/0239263 A1* | 10/2006 | Torronen | H04L 67/1019 370/389 |
| 2007/0083765 A1 | 4/2007 | Clevy et al. | |
| 2007/0234428 A1* | 10/2007 | Rash | H04L 63/12 726/25 |
| 2008/0289040 A1 | 11/2008 | Ithal | |
| 2009/0037353 A1* | 2/2009 | Greenwald | H04L 43/50 706/20 |
| 2009/0092057 A1 | 4/2009 | Doctor et al. | |
| 2009/0182864 A1 | 7/2009 | Khan et al. | |
| 2010/0161795 A1 | 6/2010 | Deridder et al. | |
| 2011/0231935 A1 | 9/2011 | Gula et al. | |
| 2012/0011513 A1* | 1/2012 | McConaughy | G06F 9/545 718/100 |
| 2012/0066333 A1 | 3/2012 | Browning et al. | |
| 2012/0113841 A1 | 5/2012 | Todd et al. | |
| 2012/0198048 A1 | 8/2012 | Ioffe et al. | |
| 2012/0230202 A1 | 9/2012 | Reed | |
| 2013/0163598 A1* | 6/2013 | Jacobson | H04L 47/34 370/394 |
| 2014/0092900 A1 | 4/2014 | Kisela et al. | |

* cited by examiner

SYSTEMS AND METHODS FOR MODIFICATION OF P0F SIGNATURES IN NETWORK PACKETS

CROSS-REFERENCE TO RELATED APPLICATIONS

This application is a continuation of, and claims the benefit of, U.S. application Ser. No. 14/503,783, filed Oct. 1, 2014 (currently pending), which claims priority to U.S. Provisional Application No. 61/885,346, filed Oct. 1, 2013. The disclosure of the above-reference applications is expressly incorporated by reference to their entireties.

BACKGROUND

Technical Field

The subject matter disclosed herein is generally directed towards active network camouflage, and in particular, a network traffic mangling application, processor, and system thereof.

SUMMARY

In accordance with the features of the present subject matter, a method and apparatus for mangling and modifying a network traffic system is provided. The method includes filtering and capturing a packet of interest. The method further includes modifying the packet of interest based on rules mapped to filters.

The network traffic system includes a network traffic mangling application. The system further includes a user module control agent and a kernel agent, which perform the mangling application.

DETAILED DESCRIPTION

The subject matter disclosed herein is generally directed towards a network traffic mangling application. The mangling application can be utilized to modify the signature of packets transmitted in a network system.

In a non-limiting embodiment of the mangling application, the mangling application architecture comprises a user module control agent and a kernel module operable to execute the network traffic mangling application. In this particular embodiment, the application runs on compatible Linux® operating system (OS) distributions, however numerous other operating systems could be used to run the application.

Theory of Operation

Figure 1:
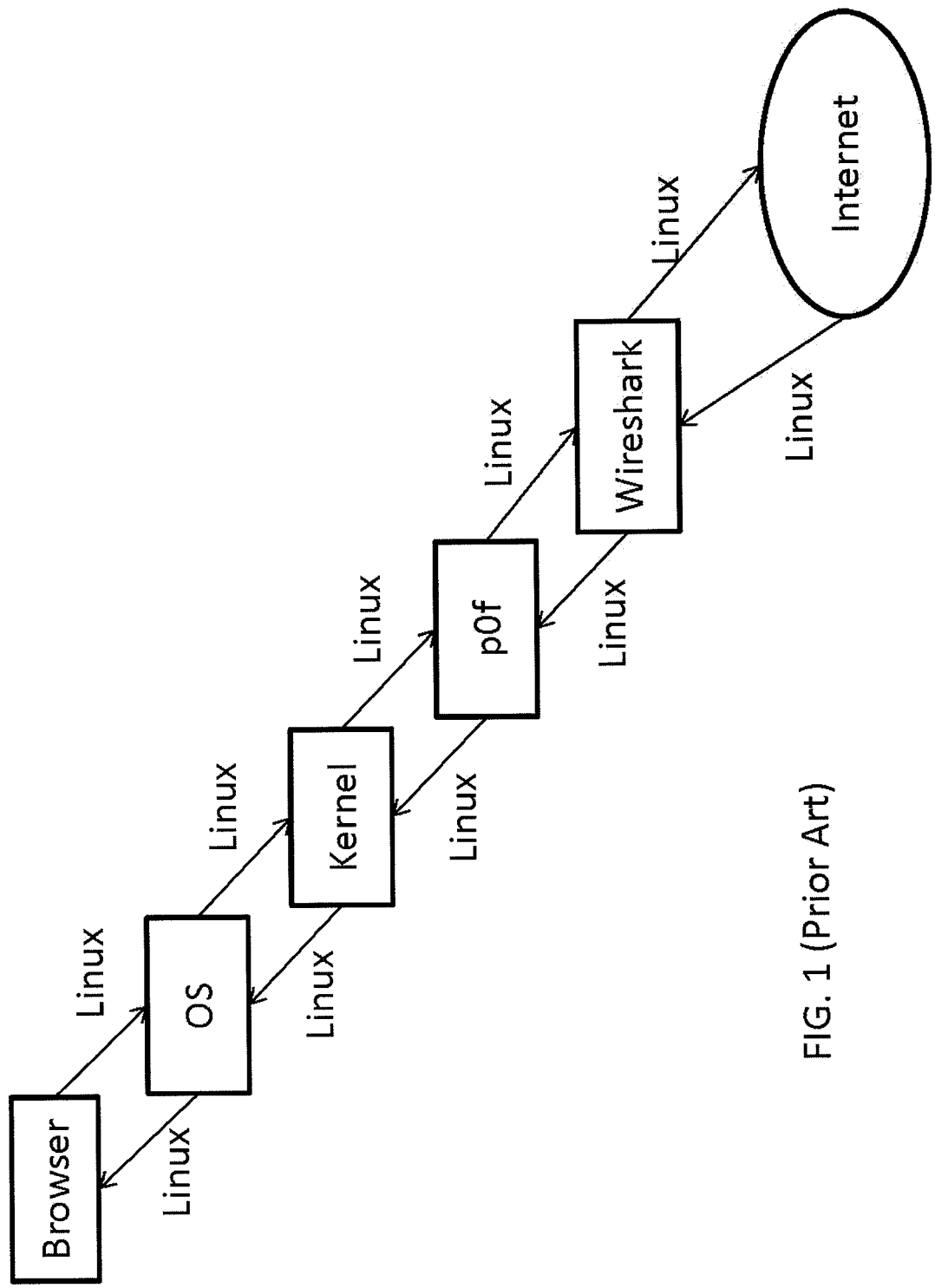
FIG. 1 is a diagram showing prior art traditional packetization of data and packet analysis tools.

Shown in FIG. 1 is a diagram showing traditional packetization of data and packet analysis tools. Typically, data leaves the browser and is packetized by the operating system, in conjunction with the kernel. Outgoing data leaves the host system as packets having a signature associated with the operating system, in this particular non-limiting example, a Linux® operating system.

The network signature of an operating system generally associates packet header information with values commonly used by a particular operating system. For example, data packet header values for fields such as Time to Live (TTL), Window Size, Don't Fragment Flag and type of service (ToS) may be used to identify the signature of operating system from which a packet originated.

When packets are transmitted through a network, their signature is maintained. Software, such as p0f, various firewalls, and deep-packet inspection systems rely on the values of the fields in packets at various layers to determine things such as the underlying platform, operating systems, and applications that may be running. A Wireshark® packet analyzer, for example, may be used to analyze the packets transmitted and display the time, source, destination, protocol and other information of the packets, and also indicate the source of the packet. This packet information is then displayed to a user via the OS.

Figure 2:
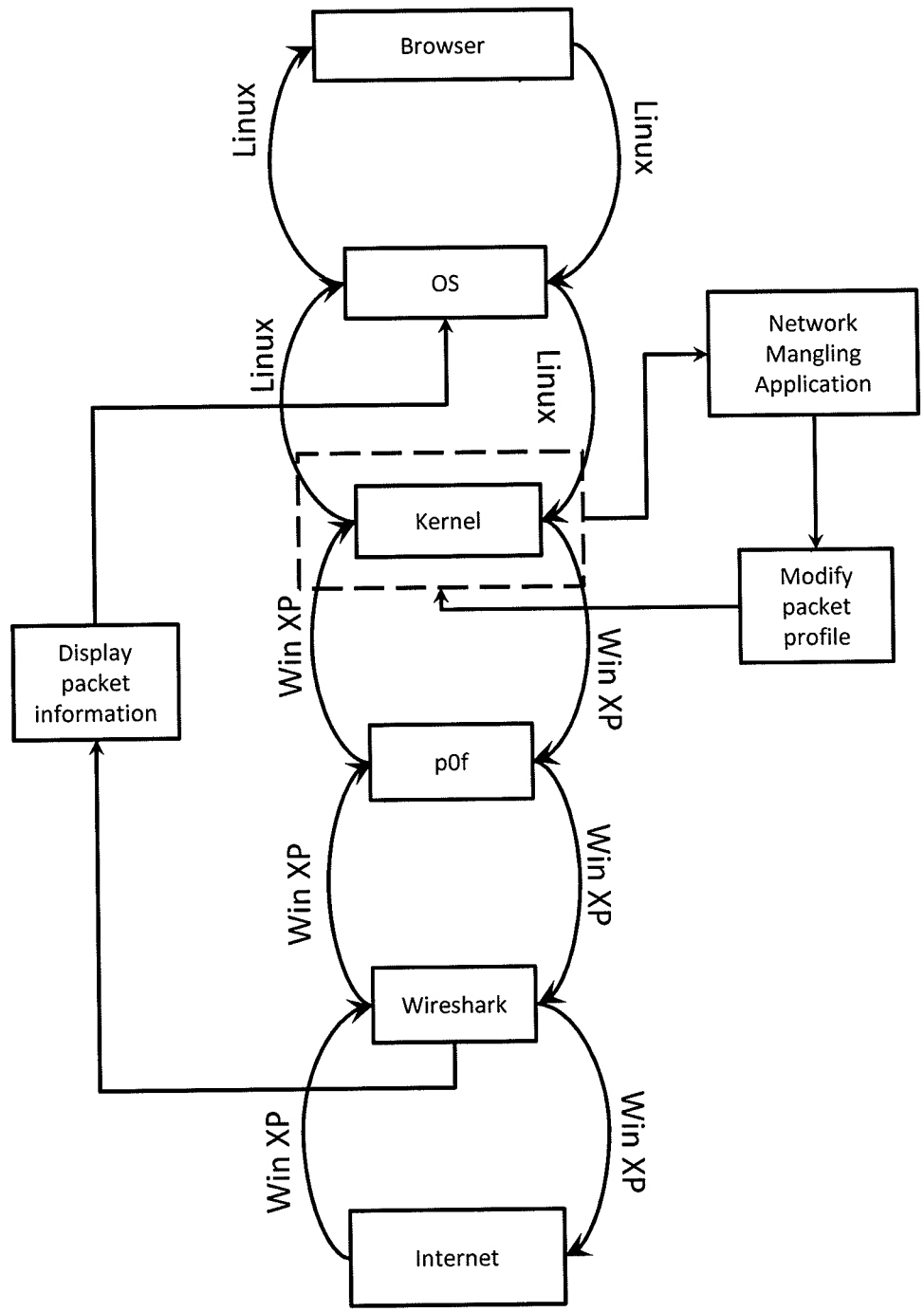
FIG. 2 is a diagram showing a non-limiting embodiment of packetization including a network traffic mangling application.

Shown in FIG. 2 is an exemplary diagram showing packetization including a network traffic mangling application of the present subject matter, which provides the capability to modify the network signature and/or the profile of packets.

Data is routed from a browser, or a software application for retrieving data, through an operating system, such as a Linux® operating system. The operating system distribution incorporates a filter, such as Netfilter libraries, in order to filter incoming and outgoing packets of data. Further, a kernel module configured to execute the network traffic mangling application is installed in conjunction with the operating system. When the kernel module is in kernel mode, the kernel module is operable to perform the network traffic mangling application.

The network traffic mangling application of the kernel module includes filters and rules that capture and modify fields and payloads of a packet of interest at the internet, transport, and application layers, referring to the TCP/IP model. The ability to modify outgoing packets based on a set of rules provides the capability to modify the network signature of packets, in order to appear as if the packets originated from a particular operating system or a second operating system, which is different than the original or first operating system. As such, packets leave the host system with a pre-selected, matching and/or different network signature, or none at all. In this particular non-limiting example, the packet signature is modified to a signature reflecting a Windows' XP® system, the second operating system, where the original packet signature reflected a Linux® system.

The modification of the packets according to the presently disclosed network traffic mangling application is accomplished, by way of non-limiting example, by leveraging a Linux® packet firewall and routing software to filter incoming and outgoing packets and modify network signatures of the packets. For example, when in kernel mode, a packet that matches a filter set by the mangling application is captured as a packet of interest. The packet of interest is then directed to the kernel module. The kernel module then looks up a map of filters and rules, and applies any rules mapped to a triggering filter to the packet. Rules then provide instructions to modify the fields and payload of packets at the internet, transport, and application layers of the TCP/IP model.

The host system having the kernel module includes individual electronic devices, but also existing hardware and network infrastructure. Accordingly, the kernel module and the network traffic mangling application may be implemented with, for example, servers, switches, nodes, repeaters, hubs, bridges, and various other hardware of existing network systems.

Additionally, the kernel module may be embodied as a computer program product comprising a non-transitory computer readable storage medium having computer readable program code embodied in the medium, the computer program product comprising: program code for causing a computer hardware device or processor to filter and capture a packet of interest; and program code for causing a computer hardware device to modify packets of interest according to rules mapped to the filters.

System Compatibility

In a non-limiting exemplary embodiment, the system compatibility of the mangling application relies on several elements relating to the Linux® operating system distribution. First, the Linux® operating system distribution has installed, or the ability to install, Netfilter libraries, modules and associated dependencies. The Linux® operating system distribution also has installed, or the ability to install or execute, a web-based scripting language, such as Python™, or a native compiled application language, such as C++. Then, in order to implement the mangling application, the user utilizing the mangling application needs sufficient privileges to insert and remove loadable kernel modules.

In the described non-limiting embodiment, the mangling application can run on any Linux® kernel that is version 2.6.18 or higher, in particular a version 3.8 kernel. The mangling application can also run on earlier versions with back-porting.

In a non-limiting exemplary embodiment, the user module control agent component of the mangling application is a single-threaded, command-line python script that provides an interactive shell for modifying/mangling the behavior of the mangling application kernel module. The control agent is capable of: loading and unloading the mangling application kernel module, managing rules and filters, and obtaining statuses from the kernel module. The user module control agent communicates with the kernel module via an agent-to-kernel module messaging protocol.

In a non-limiting exemplary embodiment, the kernel module is a single-threaded, kernel loadable kernel module capable of: binding a callback function to the Netfilter hooking object, allowing packets that match a specified filter set to be sent to the component for processing; maintaining a map of rules and filters; capturing packets of interest that match the filters and applies mapped to those filters. The kernel module communicates with the user mode control agent via the agent-to-kernel module messaging protocol.

Filtering

The kernel module maintains a list of filters that are used to specify which packets are of interest to the kernel module. The list of filters can be modified via commands sent by the user control agent. Filters may use, for example, a subset of the Berkley Packet Filter (BPF) syntax. Additionally, in order to prevent false positives (i.e., unintentional modification packets), the filters should be as specific as possible.

For example, 'tcp port 443': capture packets of protocol type tcp with a destination port of 443.

Rules

The kernel module maintains a list of rules that specify a sequence of modifications to be performed on specified fields of packets. The kernel module also maintains a map data structure that associates one or more rules with a filter. The rules specify the packet header/protocol, the fields to modify, and the modifications to apply. Modifications can include: performing an operation on a value (e.g., addition or subtraction, etc.), or replacing the value such as setting it to a different value. For example, "ip:ttl:100" sets the Time To Live (TTL) value of the packet's internet protocol header to 100 (decimal).

Example 1—Spoof of a p0f Signature p0f and similar tools attempt to determine the operating system originating a given set of packets (event through network appliances) by fingerprinting the unique way in which that platform sets the fields of network packets. A passive operating fingerprinting system, p0f, detects the type of packet filter. For example, Linux® machines of a particular kernel might set specific TCP options, if this is consistent enough, it can be used to positively identify the source of network traffic.

The mangling application described herein can fool a system that detects a given operating system signature by modifying the fields of selected traffic to match any signature, or none at all. To accomplish this, a non-limiting exemplary embodiment of the mangling application uses the following filter and rule combinations:

1. Create a filter to capture all outbound TCP traffic: "ip<host machine's ip>tcp";
2. Create a rule to set the IP TTL to match a Linux® 2.6 kernel "tcp:opt: <tcp options sequence>";
3. Create a rule to set the IP TTL to match a Linux® 2.6 kernel "ip:ttl:128"; and
4. Map each rule to the previously created filter.

Example 2—Change the Source and Destination Port of a Protocol

In some instances, network traffic is passively blocked by closing the port that the network typically transits through on a firewall or other network appliance. A common example is to block the UDP ports of VPN traffic.

The mangling application described herein can overcome the above scenario by applying a dynamic transformation of the ports to the specific traffic. If the user can find an open port, the user can direct their traffic over the open port instead, provided that the server on the other end can be changed to accept the new port or a router/firewall makes the appropriate translation. To accomplish this, a non-limiting exemplary embodiment of the mangling application uses the following filter and rule combinations:

1. Create a filter to capture all UDP traffic with a source or destination port of UDP 1194: "udp port 1194";
2. Create a rule to change the port of matching to 53 (DNS): "udp:dst-port:53"; and
3. Map the rule to the previously created filter.

Example 3—Modify the User-Agent String of the Host System

In addition to p0f, some network traffic analysis tools will extract the http user agent string from unencrypted traffic.

Even if the rest of the fields of the traffic indicate that the source is a specific operating system, this information could contradict it. In other cases the user-agent string is all that is needed to determine what platform the traffic originated from.

The mangling application described herein can complete the picture by modifying application layer protocols as well. In this case, the above-referenced issue is overcome by capturing the outbound http traffic, and replacing the user-agent string, for example:

1. Create a filter to capture all HTTP traffic: "tcp port 80";
2. Create a rule to modify the user-agent string of the HTTP traffic: "http"user-agent string>"; and
3. Map the rule to the previously created filter.

Mangling Application Agent-to-Kernel Module Messaging Protocol (A2KMP)

The A2KMP is, by way of non-limiting example, a netlink-based protocol for communications between the user module control agent and the kernel module. A typical mechanism is that the user module control agent interactive shell initiates a command that requires communication with the kernel module. The user module control agent opens a netlink socket and creates a netlink message packet with a payload containing the command and related data. When the kernel module is loaded, the kernel mode module opens a netlink socket and listens for broadcasts from the user module control agent. Upon receipt of a netlink message, the kernel module processes the packet, attempts to fulfill the request, and sends a result message back to the user module control agent. The user module control agent receives and processes the result, and, as needed, displays the result to the user.

Message Exchange Connection Diagram

Figure 3:
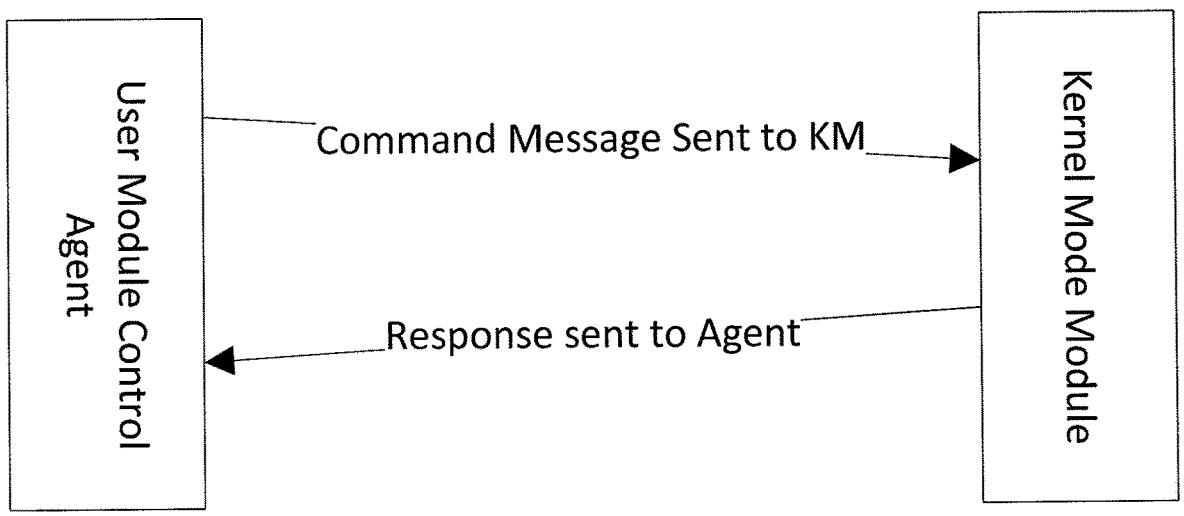
FIG. 3 is a diagram showing a non-limiting exemplary message exchange connection.

As shown in FIG. 3, a non-limiting exemplary embodiment the pattern of message exchange is as follows:

1. The user module control agent sends a message containing a request or command to the kernel module; and
2. The kernel module responds to the request and sends an acknowledgement message containing the results of the request.

When a message is sent to the kernel module and no response is received before time-out, it can be assumed that the message was not received by the kernel module and should be re-sent. Another exception to the above-referenced connection sequence is where message fragmentation occurs due to the payload exceeding a maximum size (0xFFFF bytes). In that case, multiple messages will be sent. If one or more fragments are not received, then message re-assembly will not occur and either no acknowledgement will be sent or an error message will be sent to the sender.

Mangling Application Packet Modification Rule Specification

In general, a rule is used to describe a value to be applied to the field of a packet header in a packet. Rules are mapped to filters that capture packets of interest. When a packet matching a filter is captured, the list of rules mapped to the filter are applied. The order of application is arbitrary, but may be set by a priority value. If a rule is mapped to a filter and an attempt is made to apply the rule to a packet that does not contain the header and/or field, the rule will not be applied and an error message will be logged and provided to the user on the next status request. Similarly, if the value creates an overflow condition, then it will not be applied and the problem will be logged.

Each rule to be defined may be defined as a comma delimited key-value comprising a header value, a field value, and a value value. The header refers to the packet header to be modified. The field refers to the field of the header to be modified. The value value refers to the value to be set: {id}:{header:field:value}.

Each rule may include a 4-byte ID value that uniquely identifies the rule and is used in mapping filters to rules. The ID value is assigned when the rule is added and returned in the result sent to the user module control agent. The result can also be displayed when the list of rules is retrieved. Additionally, multiple rules can be chained together: {rule}, {rule}, . . . {rule}.

Headers

The mangling application described herein supports the following packet types (at different layers): IPv4, TCP, UPD, ICMP, ICMP, HTTP, and SSL/TLS. Additional packets types can be supported as needed.

Fields and Values

The fields specified are dependent on the packet type. For each packet, almost all fields are accessible, but values can have operators associated with them. This facilitates mutating/modifying an existing value, rather than setting it. By way of non-limiting example, operators: +, −, *, and / perform an arithmetic mutating operation on an existing value.

Mangling Application Packet Filtering Rule Specification

Filters of the filtering mechanism implement, by way of non-limiting example, a sub-set of the Berkley Packet Filter (BPF) syntax. The filters are used to identify packets of interest to the kernel module. Filters are maintained via commands from the user module control agent. When a filter is added, the filter is used to modify the syntax of a primary filter used to request packets.

Filters are uniquely identified by an ID value. The ID value is assigned by the kernel module when the filter is added and returned with the result. The ID can be shown a list of filters is requested, and duplicate filters cannot exist. Exemplary filters include: Capture HTTP Traffic "tcp port 80"; capture ICMP traffic "ip[9]=0x01"; and capture SYN packets "tcp[13] & 1<<2".

The invention claimed is:

1. A system comprising:
one or more hardware processors; and
one or more storage devices storing instructions that, when executed, configure the one or more hardware processors to perform operations comprising:
initializing at least one network filter comprising one or more capturing rules;
receiving, from a first system, a packet that matches the one or more capturing rules;
modifying a p0f signature of the packet based on p0f signatures of a second system by modifying a first field of the packet to match a kernel field of the second system and modifying a second field of the packet to match a port field of the second system, the second system being different from the first system; and transmitting the packet to a user system.

2. The system of claim 1, wherein the at least one network filter comprises a Berkley Packet Filter configured to identify packets based on a packet syntax.

3. The system of claim 1, wherein the at least one network filter comprises a plurality of filters comprising:
   a first filter to capture outbound TCP traffic;
   a second filter to capture UDP traffic;
   a third filter to capture HTTP traffic;
   a fourth filter to capture ICMP traffic; and
   a fifth filter to capture SYN packets.

4. The system of claim 3, wherein the operations further comprise:
   assigning a unique 4-byte ID to each of the plurality of filters; and
   eliminating duplicate filters.

5. The system of claim 1, wherein modifying the p0f signature further comprises:
   modifying a third field of the packet to replace a time to live value; and
   modifying a fourth field of the packet to be a user-agent field associated by a finger printing tool of the second system.

6. The system of claim 1, wherein
   the first system is associated with a proprietary operating system; and
   the second system is associated with an open source operating system.

7. The system of claim 1, wherein
   the first system is associated with an open source operating system; and
   the second system is associated with a proprietary operating system.

8. The system of claim 1, the operations further comprising displaying in a user interface a time of the packet, a source of the packet, a destination of the packet, and a protocol of the packet.

9. The system of claim 1, the operations further comprising:
   determining a first port in the user system is blocked on a firewall;
   determining a second port in the user system is accessible; and
   modifying a port field in the packet to match the second port by applying a dynamic transformation of the port field.

10. The system of claim 9, wherein modifying the port field comprises modifying a UDP port field.

11. The system of claim 1, wherein each one of the one or more capturing rules is defined as a comma delimited key-value comprising a header value and a field value.

12. The system of claim 11, wherein each one of the one or more capturing rules comprises a 4-byte ID value that uniquely identifies a corresponding rule.

13. The system of claim 12, wherein the one or more capturing rules are configurable via an interactive shell provided through a single-threaded script.

14. The system of claim 1, wherein receiving, from the first system, the packet, comprises:
   loading a kernel module that opens a netlink socket; and
   transmitting an acknowledgement to the first system.

15. The system of claim 14, wherein the kernel module maintains a list of the at least one network filter comprising the one or more capturing rules.

16. The system of claim 1, the operations further comprising:
   determining a payload of the packet exceeds a maximum size; and
   fragmenting the packet for transmission when the packet exceeds the maximum size.

17. A computer-implemented method comprising:
   initializing at least one network filter comprising one or more capturing rules;
   receiving, from a first system, a packet that matches the one or more capturing rules;
   modifying a p0f signature of the packet based on p0f signatures of a second system by modifying: a first field of the packet to match a kernel field of the second system, a second field of the packet to match a port field of the second system, and a third field of the packet to replace a time to live value, the second system being different from the first system; and
   transmitting the packet to a user system.

18. An apparatus comprising:
   at least one memory device storing a set of instructions; and
   at least one processor coupled to the at least one storage device, the set of instructions configuring the at least one processor to perform operations comprising:
      initializing at least one network filter comprising one or more capturing rules;
      receiving, from a first system, a packet that matches the one or more capturing rules;
      modifying a p0f signature of the packet based on p0f signatures of a second system by modifying a first field of the packet to match a kernel field of the second system and modifying a second field of the packet to match a port field of the second system, the second system being different from the first system; and
      transmitting the packet to a user system.

19. A non-transitory computer-readable medium storing instructions comprising:
   initializing at least one network filter comprising one or more capturing rules;
   receiving, from a first system, a packet that matches the one or more capturing rules;
   modifying a p0f signature of the packet based on p0f signatures of a second system by modifying a first field of the packet to match a kernel field of the second system and modifying a second field of the packet to match a port field of the second system, the second system being different from the first system; and
   transmitting the packet to a user system.

20. The system of claim 1, wherein modifying the p0f signature further comprises:
   modifying a third field of the packet to be a user-agent field associated by a finger printing tool of the second system.

* * * * *